United States Patent
Huang et al.

(10) Patent No.: US 11,093,009 B2
(45) Date of Patent: Aug. 17, 2021

(54) MOVALBE INPUT DEVICE IN A COMPUTER CASING

(71) Applicant: PRIMAX ELECTRONICS LTD., Taipei (TW)

(72) Inventors: Tai-Sou Huang, Taipei (TW); Shao-Ju Yen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/659,991

(22) Filed: Oct. 22, 2019

(65) Prior Publication Data
US 2021/0064081 A1 Mar. 4, 2021

(30) Foreign Application Priority Data
Aug. 30, 2019 (TW) ................... 108131381

(51) Int. Cl.
*G06F 1/16* (2006.01)
*H01H 21/12* (2006.01)
*H01H 21/24* (2006.01)

(52) U.S. Cl.
CPC ............ *G06F 1/169* (2013.01); *H01H 21/12* (2013.01); *H01H 21/24* (2013.01); *G06F 1/1616* (2013.01); *H01H 2231/002* (2013.01)

(58) Field of Classification Search
CPC ....... G06F 1/1615–1622; G06F 1/1684; G06F 1/169; G06F 1/1692; G06F 3/0354; G06F 3/03547; H01H 21/12; H01H 21/18; H01H 21/22; H01H 21/2428; H01H 2231/002; E05D 7/10–1022; E05D 7/1061–1077; E05D 7/12–125; E05D 2005/108; E05D 2007/1027–1038; E05D 2007/128
See application file for complete search history.

(56) References Cited

U.S. PATENT DOCUMENTS

| | | | | |
|---|---|---|---|---|
| 6,708,372 B2* | 3/2004 | Stewart | ............. | H05K 7/20172 16/422 |
| 2006/0250377 A1* | 11/2006 | Zadesky | ............... | G06F 1/1637 345/173 |
| 2013/0229369 A1* | 9/2013 | Oshita | ................. | G06F 3/03547 345/173 |
| 2013/0328741 A1* | 12/2013 | Degner | .................. | G06F 1/203 343/841 |
| 2015/0169005 A1* | 6/2015 | Yanagida | ............ | G06F 3/03547 345/173 |

* cited by examiner

*Primary Examiner* — Nathan Danielsen
(74) *Attorney, Agent, or Firm* — WPAT, PC

(57) ABSTRACT

A touch module includes a touchpad assembly and a connection assembly. The connection assembly includes a main body, plural first coupling plates and plural protrusion posts. When the connection assembly is accommodated within a computer casing, the plural first coupling plates are penetrated through plural first openings of the computer casing and the plural protrusion posts are inserted into the corresponding fixing structures. The plural protrusion posts and the corresponding fixing structures are collaboratively formed as a hinge structure. While the touchpad assembly is pressed down, the connection assembly is swung relative to the computer casing by using the plural protrusion posts as the pivotal shafts, so that the touchpad assembly is correspondingly swung. Due to the hinge structure, the touchpad assembly is swung along a fixed direction. Consequently, the touch module is operated stably.

9 Claims, 7 Drawing Sheets

MOVALBE INPUT DEVICE IN A COMPUTER CASING

FIELD OF THE INVENTION

The present invention relates to an input device, and more particularly to a touch module that is installed on a computer.

BACKGROUND OF THE INVENTION

The widely-used peripheral input device of a computer system includes for example a mouse device, a keyboard device, a trackball device, or the like. With the progress of the times, a touch module is introduced into the market. By directly using the user's fingers to operate the touch module, the computer system can be correspondingly controlled. The applications of the touch module are very extensive. In the early stage, a notebook computer is equipped with a touch module. By operating the touch mouse, the movement of a cursor may be controlled or a corresponding icon of a user interface may be clicked without the need of using a mouse to operate the notebook computer. In an advantage of the touch module, the touch module can be intuitively operated by the user and thus various commands can be correspondingly executed.

FIG. 1 schematically illustrates a conventional notebook computer with a touch module. The touch module 1 is installed on a computer casing 21 of a notebook computer 2. Moreover, the touch module 1 is partially exposed outside the computer casing 21. When the touch module 1 is pressed down by the user's finger, the notebook computer 2 is correspondingly controlled. For example, when the user's finger is placed on the touch module 1 and moved on the touch module 1, a cursor 23 shown on a display screen 22 of the notebook computer 2 is correspondingly moved. Alternatively, the user may press down the touch module 1 to execute a button function of the notebook computer 2. In other words, the touch module 1 can be used to replace the mouse. Since it is not necessary to additionally carry and install the mouse, the use of the touch module is more convenient.

The inner structure of the conventional touch module will be described as follows. FIG. 2 is a schematic cross-sectional side view illustrating the conventional touch module. Please refer to FIGS. 1 and 2. The touch module 1 is installed in the computer casing 21 and partially exposed outside the computer casing 21. The touch module 1 comprises a frame structure 11, a touchpad assembly 12, a sponge structure 13 and a supporting metal block 14. The frame structure 11 is disposed on the computer casing 21. The frame structure 11 comprises a triggering part 111. The sponge structure 13 is attached on an edge of the frame structure 11 through an adhesive. In addition, the supporting metal block 14 is attached on the sponge structure 13 through an adhesive. The touchpad assembly 12 is located over the frame structure 11. A first end of the touchpad assembly 12 is connected with the supporting metal block 14 through an adhesive. The touchpad assembly 12 comprises a covering plate 121, a circuit board 122 and a switch element 123. A first end of the circuit board 122 is connected with the supporting metal block 14. The switch element 123 is disposed on a bottom surface of the circuit board 122 and located at a second end of the circuit board 122. The covering plate 121 is disposed on the circuit board 122 and exposed outside the computer casing 21.

FIG. 3 is a schematic cross-sectional side view illustrating the conventional touch module, in which the touchpad assembly is pressed down. Please refer to FIGS. 1, 2 and 3. When the user's finger is placed on the touchpad assembly 12 to press down the touchpad assembly, a second end of the touchpad assembly 12 (e.g., the position corresponding to the switch element 123) is swung downwardly relative to the computer casing 21 by using the supporting metal block 14 and the sponge structure 13 as fulcrums. As the touchpad assembly 12 is pressed down, the sponge structure 13 is compressed in response to the pressing force. Consequently, the touchpad assembly 12 is swung downwardly. While the touchpad assembly 12 is swung downwardly, the switch element 123 on the circuit board 122 and the triggering part 111 of the frame structure 11 are contacted with each other. Meanwhile, the switch element 123 is triggered to generate a corresponding key signal to the notebook computer 2. According to the key signal, the notebook computer 2 executes a corresponding command. When the user's finger is not placed on the touchpad assembly 12, the touchpad assembly 12 is swung upwardly and returned to its original position in response to the internal elastic force of the switch element 123 and the elastic restoring force of the sponge structure 13. Due to the above operations, the conventional touch module 1 can achieve the button function to replace the mouse.

In the conventional touch module 1, the touchpad assembly 12 is fixed on the sponge structure 13. The supporting metal block 14 is located under the sponge structure 13. While the touchpad assembly 12 is pressed down, the sponge structure 13 is compressed and thus the touchpad assembly 12 is correspondingly swung. However, the conventional touch module 1 still has some drawbacks. For example, the sponge structure 13 is irregularly compressed in various directions. Since the touchpad assembly 12 is swung unstably, the tactile feel of the conventional touch module 1 is impaired.

Moreover, the computer casing 21 of the notebook computer 2 comprises an accommodation structure 211. The touchpad assembly 12 is accommodated within the accommodation structure 211. The touchpad assembly 12 is fixed on the computer casing 21 through plural screws 15 by a screwing means. However, because of the screwing means, the screwed positions of the touchpad assembly 12 are readily suffered from deformation. Since the top surface of the touchpad assembly 12 cannot be aligned with the top surface of the computer casing 21, the top surface of the overall notebook computer is not flat. In other words, the appearance is not aesthetically pleasing, and the tactile feel is impaired.

Therefore, there is a need of providing a touch module with enhanced operating stability.

SUMMARY OF THE INVENTION

An object of the present invention provides a touch module with enhanced operating stability.

In accordance with an aspect of the present invention, a touch module is provided. The touch module is installed on a computer casing. The computer casing includes an accommodation structure, plural first openings and plural fixing structures. The touch module includes a touchpad assembly and a connection assembly. The touchpad assembly is accommodated within the accommodation structure and partially exposed outside the computer casing. While the touchpad assembly is pressed down, the touchpad assembly is swung relative to the computer casing and contacted with the computer casing. Consequently, a corresponding key signal is generated. The connection assembly is disposed on a bottom surface of the touchpad assembly. The connection assembly is connected with the touchpad assembly and the computer casing, so that the connection assembly is permitted to be swung relative to the computer casing. When the touchpad assembly is accommodated within the accommodation structure, a portion of the connection assembly is penetrated through the plural first openings and fixed on the plural fixing structures.

In an embodiment, the connection assembly includes a main body, plural first coupling plates and plural protrusion posts. The main body is fixed on the bottom surface of the touchpad assembly. The plural first coupling plates are located at two ends of the main body, and extended externally from the two ends of the main body. The first coupling plates are bent structures relative to the main body. When the touchpad assembly is accommodated within the accommodation structure, the plural first coupling plates are penetrated through the corresponding first openings and located beside the corresponding fixing structures. The plural first coupling plates are aligned with the corresponding fixing structures. The plural protrusion posts are aligned with the corresponding first coupling plates and disposed on the corresponding first coupling plates. When the touchpad assembly is accommodated within the accommodation structure, the plural protrusion posts are inserted into the corresponding fixing structures, so that the connection assembly and the computer casing are combined together.

In an embodiment, the plural fixing structure comprises plural fixing holes, respectively. The plural fixing holes are aligned with the corresponding protrusion posts. When the plural protrusion posts are inserted into the fixing holes of the corresponding fixing structures, the plural protrusion posts are received within the corresponding fixing structures. While the touchpad assembly is pressed down and the touchpad assembly is swung relative to the computer casing, the plural protrusion posts are rotated within the corresponding fixing holes.

From the above descriptions, the present invention provides a touch module with a touchpad assembly and a connection assembly. The connection assembly comprises plural protrusion posts. The computer casing comprises plural fixing structures corresponding to the protrusion posts. When the connection assembly and the computer casing are combined together, the plural protrusion posts are inserted into the fixing holes of the corresponding fixing structures. The plural protrusion posts and the corresponding fixing structures are collaboratively formed as a hinge structure, which is swung along a fixed direction. The sponge structure used in the conventional touch module is replaced by the plural protrusion posts and the corresponding fixing structures. Since the sponge structure is not used, the irregular deformation is not produced. Consequently, while the touchpad assembly is pressed down, the touch module is not irregularly rocked. The touchpad assembly of the touch module can be swung stably. In other words, the touch module of the present invention is capable of solving the drawbacks of the conventional technologies. Moreover, it is not necessary to use screws to fix the touchpad assembly on the computer casing. Since the top surface of the touchpad assembly is aligned with the top surface of the computer casing, the top surface of the overall notebook computer is flat. In other words, the appearance is aesthetically pleasing.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
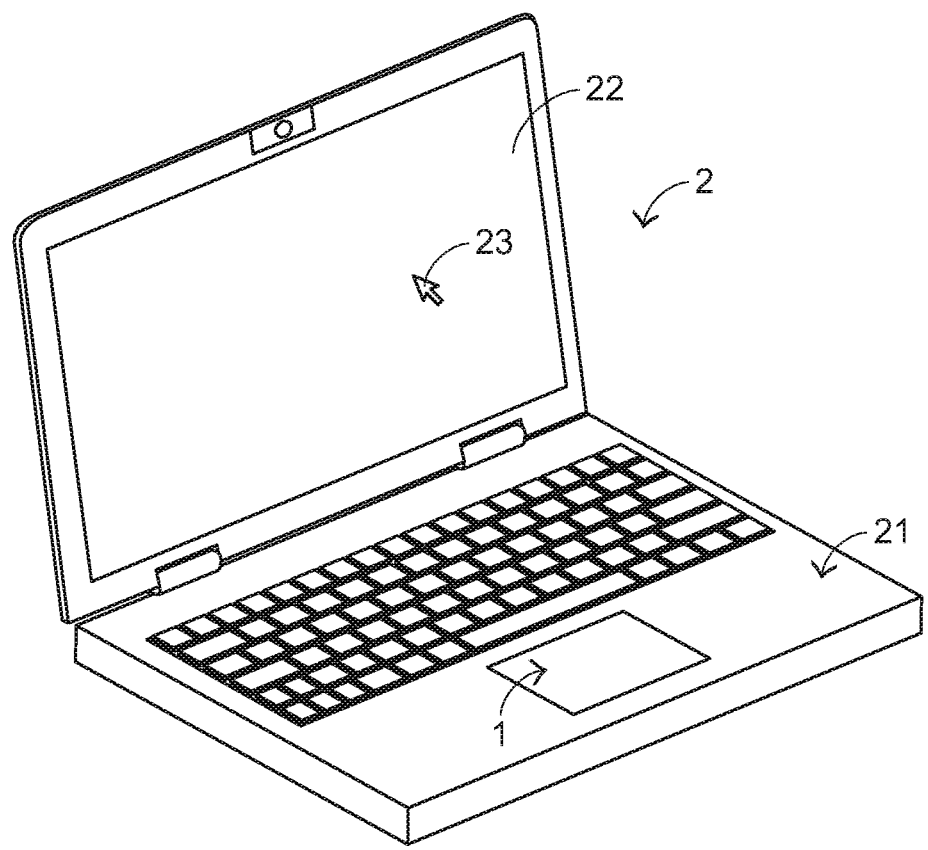
FIG. 1 schematically illustrates a conventional notebook computer with a touch module.
Figure 2:
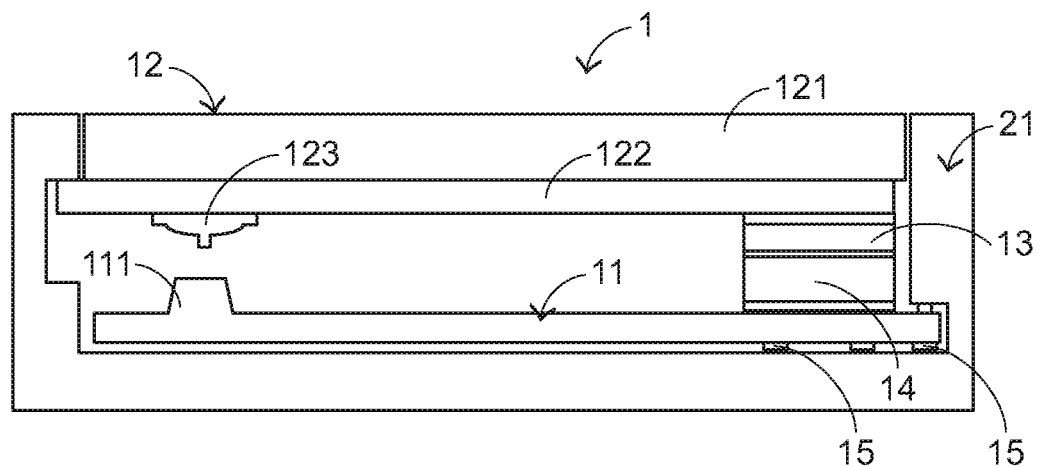
FIG. 2 is a schematic cross-sectional side view illustrating the conventional touch module.
Figure 3:
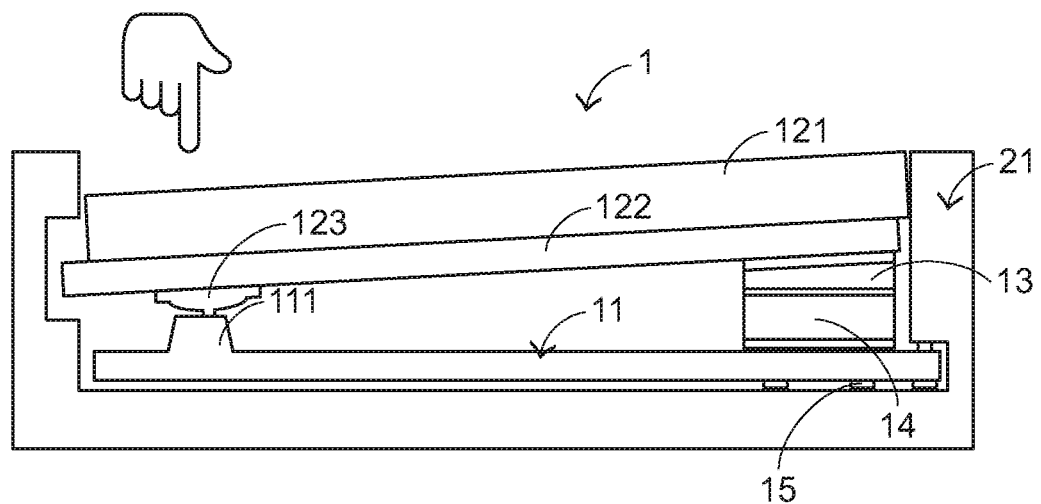
FIG. 3 is a schematic cross-sectional side view illustrating the conventional touch module, in which the touchpad assembly is pressed down.

The present invention provides a touch module in order to overcome the drawbacks of the conventional technologies. The embodiments of present invention will be described more specifically with reference to the following drawings. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 4:
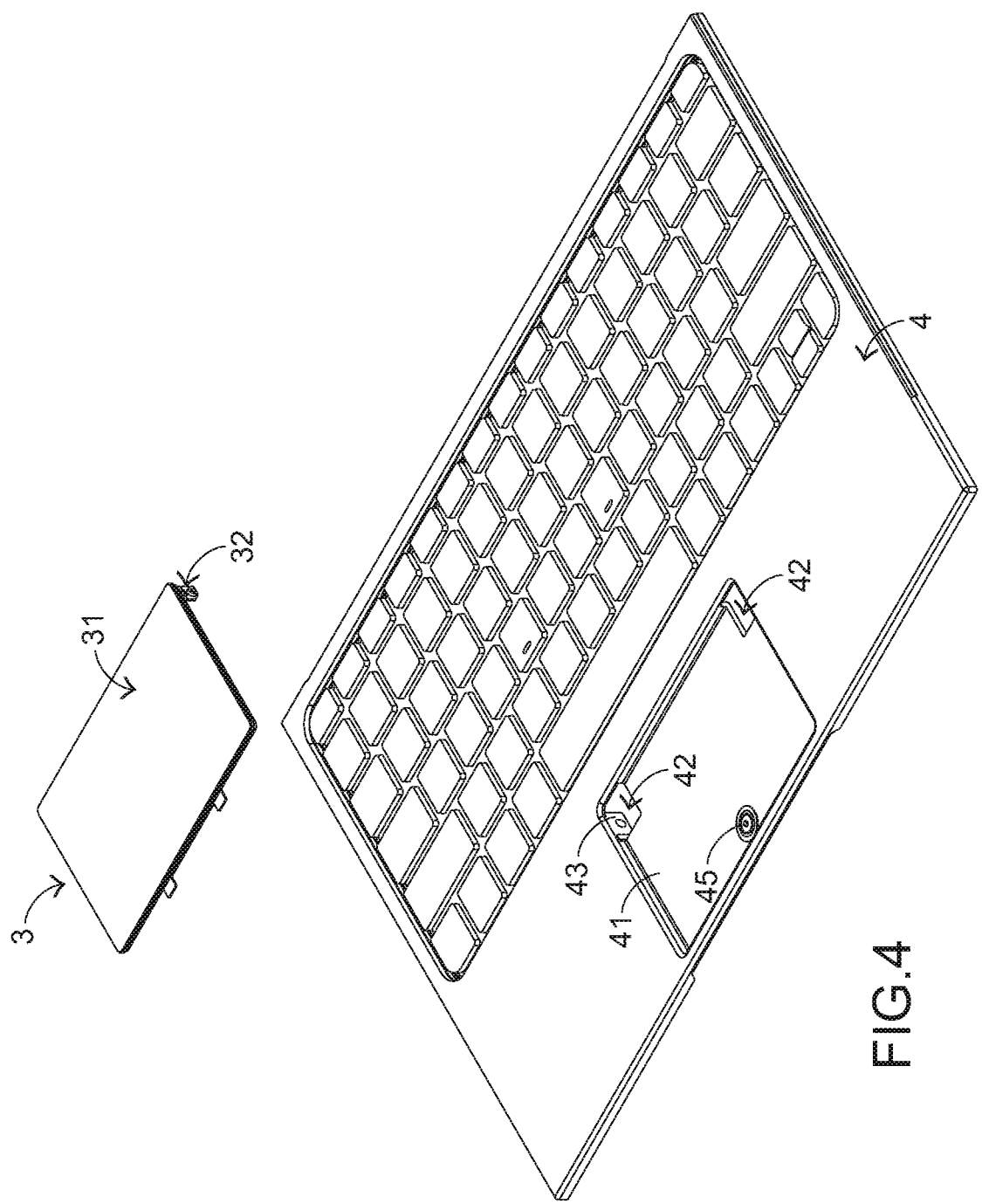
FIG. 4 is a schematic exploded view illustrating a touch module and a computer casing according to an embodiment of the present invention and taken along a first viewpoint.
Figure 5:
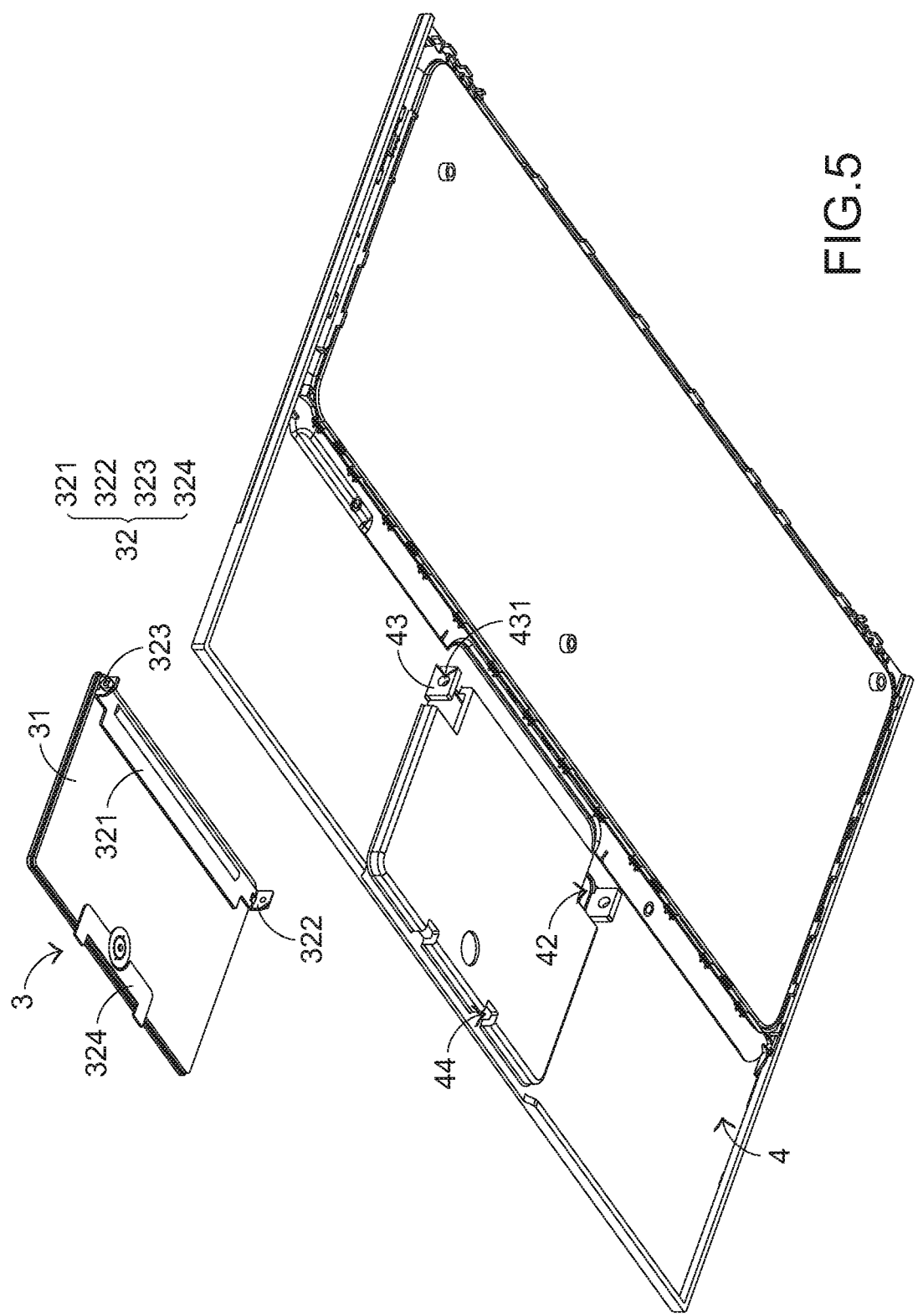
FIG. 5 is a schematic exploded view illustrating the touch module and the computer casing according to the embodiment of the present invention and taken along a second viewpoint.

Please refer to FIGS. 4 and 5. FIG. 4 is a schematic exploded view illustrating a touch module and a computer casing according to an embodiment of the present invention and taken along a first viewpoint. FIG. 5 is a schematic exploded view illustrating the touch module and the computer casing according to the embodiment of the present invention and taken along a second viewpoint. The touch module 3 is installed on a computer casing 4 and exposed outside the computer casing 4. The computer casing 4 comprises an accommodation structure 41, plural first openings 42, plural fixing structures 43 and plural second openings 44. The plural first openings 42 are disposed within the accommodation structure 41 and located at a first side of the accommodation structure 41. The plural fixing structures 43 are aligned with the corresponding first openings 42, respectively. The plural fixing structures 43 are disposed on a bottom surface of the computer casing 4 and located beside the corresponding first openings 42. Each fixing structure 43 comprises a fixing hole 431. The plural second openings 44 are disposed within the accommodation structure 41 and located at a second side of the accommodation structure 41. In this embodiment, the plural fixing structures 43 are protruded externally from the bottom surface of the computer casing 4, and the plural fixing structures 43 are integrally formed with the computer casing 4.

In an embodiment, the touch module 3 comprises a touchpad assembly 31 and a connection assembly 32. The touchpad assembly 31 is accommodated within the accommodation structure 41 and partially exposed outside the computer casing 4. The touchpad assembly 31 has two functions. Firstly, the touchpad assembly 31 generates a touch signal when a user's finger on the touchpad assembly 31 is detected. Secondly, when the touchpad assembly 31 is swung relative to the computer casing 4 in response to a depressing force of the user and contacted with the computer casing 4, a corresponding key signal is generated. The connection assembly 32 is disposed on a bottom surface of the touchpad assembly 31. The touchpad assembly 31 and the computer casing 4 are connected with each other through the connection assembly 32. Consequently, the touchpad assembly 31 can be swung relative to the computer casing 4. When the touchpad assembly 31 is accommodated within the accommodation structure 41, the connection assembly 32 is partially penetrated through the plural first openings 42 and pivotally coupled to the plural fixing structures 43.

Figure 6:
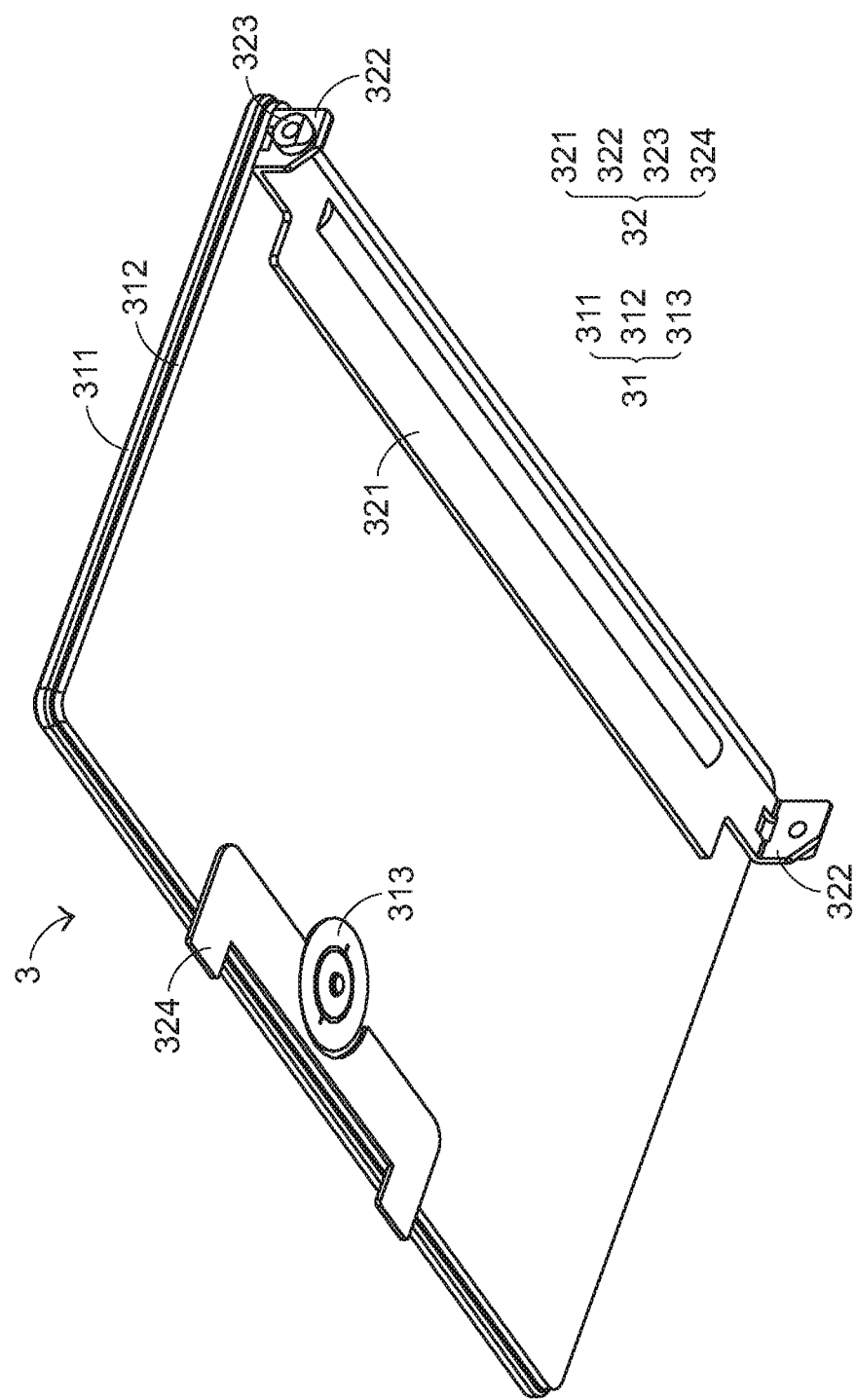
FIG. 6 is a schematic perspective view illustrating the touch module according to the embodiment of the present invention and taken along the second viewpoint.

The structures of the touchpad assembly 31 and the connection assembly 32 will be described as follows. FIG. 6 is a schematic perspective view illustrating the touch module according to the embodiment of the present invention and taken along the second viewpoint. The touchpad assembly 31 comprises a covering plate 311, a circuit board 312 and a switch element 313. The covering plate 311 is exposed outside the computer casing 4. The circuit board 312 is located under the covering plate 311. Moreover, the circuit board 312 is connected with the covering plate 311 and the connection assembly 32. The switch element 313 is disposed on a bottom surface of the circuit board 312 and electrically connected with the circuit board 312. When the switch element 313 is contacted with the computer casing 4, the switch element 313 is triggered to generate a corresponding key signal. While the covering plate 311 is depressed by the user, the covering plate 311, the circuit board 312 and the switch element 313 are swung relative to the computer casing 4, and the switch element 313 and a triggering part 45 of the computer casing 4 are contacted with each other. Consequently, the corresponding key signal is generated. In an embodiment, the circuit board 312 is connected with the covering plate 311 through an adhering means. For example, the circuit board 312 and the covering plate 311 are combined together through a pressure sensitive adhesive.

Figure 7:
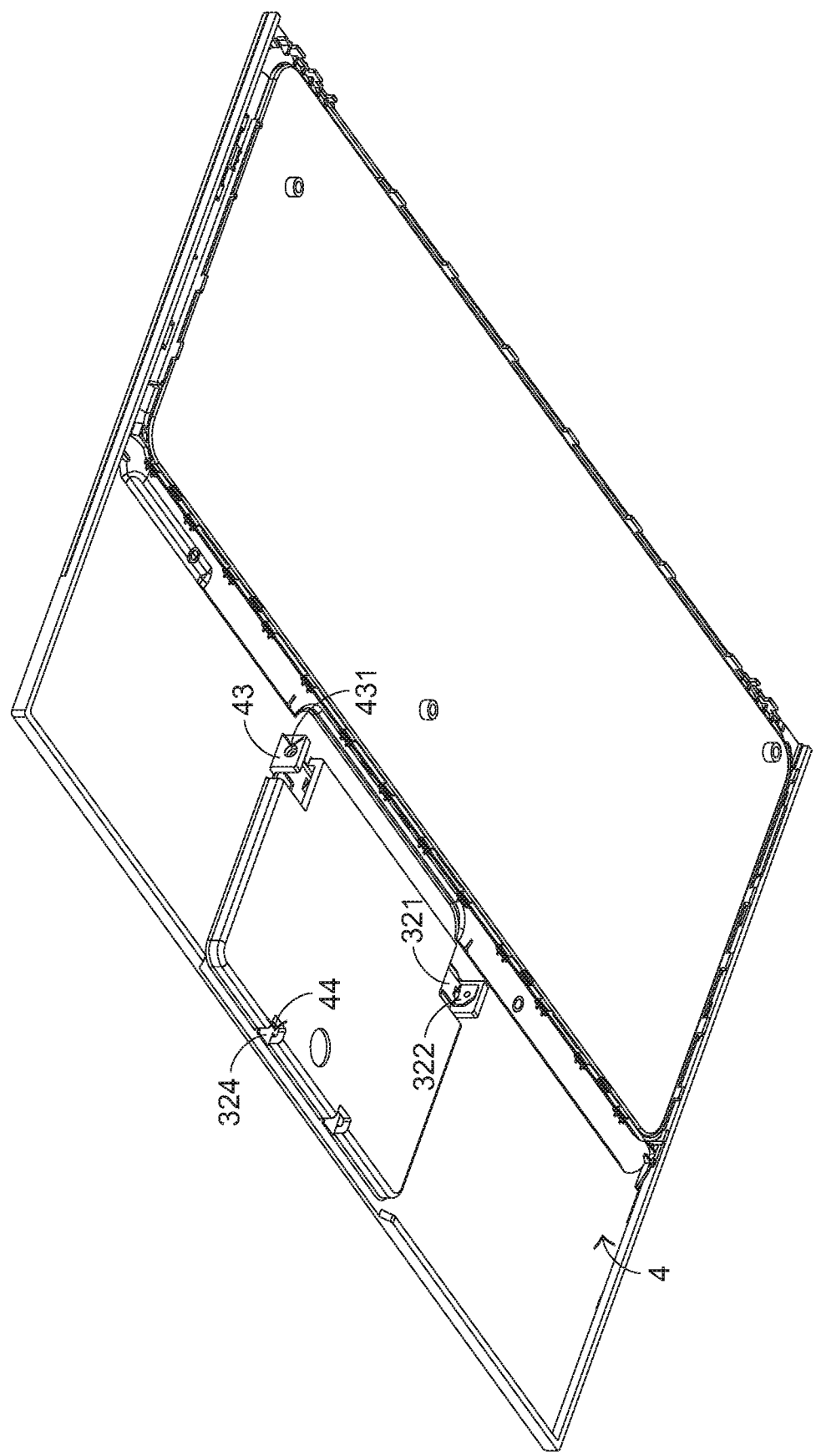
FIG. 7 is a schematic perspective view illustrating the combination of the touch module and the computer casing according to the embodiment of the present invention.

FIG. 7 is a schematic perspective view illustrating the combination of the touch module and the computer casing according to the embodiment of the present invention. Please refer to FIGS. 6 and 7. The connection assembly 32 comprises a main body 321, plural first coupling plates 322, plural protrusion posts 323 and a second coupling plate 324. The main body 321 is fixed on the bottom surface of the circuit board 312 of the touchpad assembly 31. The plural first coupling plates 322 are located at two ends of the main body 321 and extended externally from the two ends of the main body 321. Each of the plural first coupling plates 322 is aligned with one corresponding first opening 42. In this embodiment, the first coupling plates 322 are L-shaped bent structures relative to the main body 321. When the touchpad assembly 31 is accommodated within the accommodation structure 41, the plural first coupling plates 322 are penetrated through the corresponding first openings 42 and located beside the corresponding fixing structures 43. Each first coupling plate 322 is aligned with one corresponding fixing structure 43. In an embodiment, the main body 321 is fixed on the bottom surface of the circuit board 312 through an adhering means. For example, the circuit board 312 and the main body are combined together through a pressure sensitive adhesive. It is noted that the way of connecting the main body and the circuit board is not restricted. For example, the main body is fixed on the circuit board through an embedding means, an assembling means or any other appropriate connecting means.

The functions of the plural protrusion posts 323 will be described as follows. Each protrusion post 323 is aligned with one corresponding first coupling plate 322 and disposed on the corresponding first coupling plate 322. When the touchpad assembly 31 is accommodated within the accommodation structure 41, the plural protrusion posts 323 are inserted into the fixing holes 431 of the corresponding fixing structures 43. Consequently, the connection assembly 32 and the computer casing 4 are combined together. Moreover, since the plural protrusion posts 323 are rotatable within the fixing holes 431 of the corresponding fixing structures 43, the connection assembly 32 can be swung relative to the computer casing 4. As the connection assembly 32 is swung, the touchpad assembly 31 connected with the connection assembly 32 is correspondingly swung. In this embodiment, the plural first coupling plates 322 and the plural protrusion posts 323 are integrally formed with the main body 321, and the main body 321, the plural first coupling plates 322 and the plural protrusion posts 323 are made of metallic material. It is noted that numerous modifications and alterations may be made while retaining the teachings of the invention. For example, in another embodiment, the plural first coupling plates and the plural protrusion posts are connected with the main body through an embedding means, an assembling means or any other appropriate connecting means.

The second coupling plate 324 of the connection assembly 32 is also disposed on the bottom surface of the circuit board 312 and located near the switch element 313. At least a portion of the second coupling plate 324 is protruded outside the touchpad assembly 31. When the touchpad assembly 31 is accommodated within the accommodation structure 41, the protruded portions of the second coupling plate 324 are inserted into the corresponding second openings 44. Consequently, the connection assembly 32 and the computer casing 4 are combined together more securely. Due to the structure of the second coupling plate 324, the connection assembly 32 and the computer casing 4 are assembled according to the following assembling sequence. Firstly, the portions of the second coupling plate 324 are inserted into the corresponding second openings 44. Then, the touchpad assembly 31 is accommodated within the accommodation structure 41.

Figure 8:
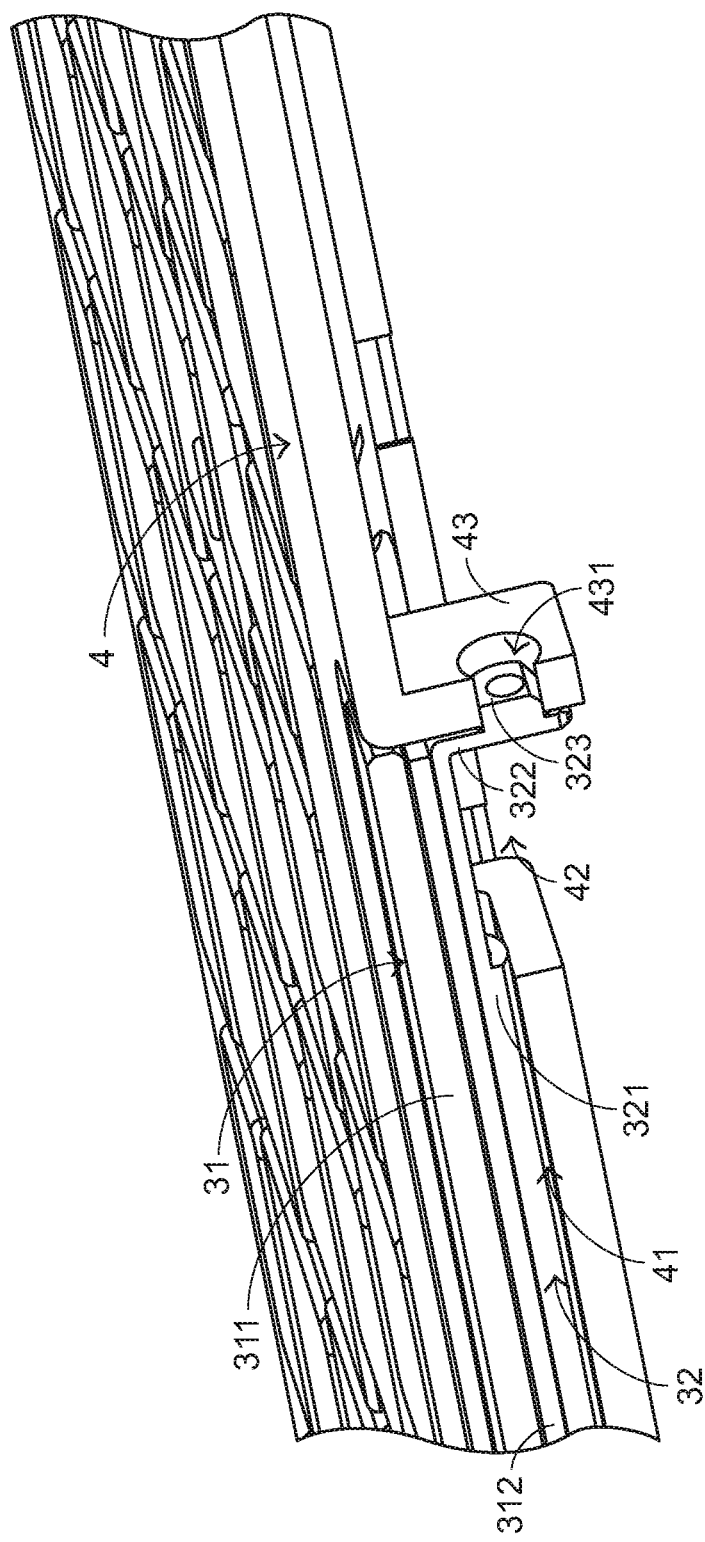
FIG. 8 is a schematic cutaway view illustrating the combination of the touch module and the computer casing according to the embodiment of the present invention.

FIG. 8 is a schematic cutaway view illustrating the combination of the touch module and the computer casing according to the embodiment of the present invention. In FIGS. 7 and 8, the combined structure of the touch module 3 and the computer casing 4 is shown. The touchpad assembly 31 is accommodated within the accommodation structure 41. The plural first coupling plates 322 are penetrated through the corresponding first openings 42 and located beside the corresponding fixing structures 43. The portions of the second coupling plate 324 are inserted into the corresponding second openings 44. The plural protrusion posts 323 are inserted into the fixing holes 431 of the corresponding fixing structures 43. Consequently, the plural protrusion posts 323 are received within the corresponding fixing structures 43.

The operations of the touch module 3 will be described as follows. When the touch module 3 is not pressed down, the switch element 323 and the triggering part 45 are not contacted with each other. While the covering plate 311 of the touchpad assembly 31 is pressed down by the user's finger, the circuit board 312 is pushed by the covering plate 311, and the connection assembly 32 is pushed by the circuit board 312. Consequently, the connection assembly 32 is swung relative to the computer casing 4. Moreover, the plural protrusion posts 323 are rotated within the fixing holes 431 of the corresponding fixing structures 43. That is, the connection assembly 32 is swung relative to the fixing structures 43 by using the plural protrusion posts 323 as the pivotal shafts. Consequently, the covering plate 311, the circuit board 312 and the switch element 313 are swung downwardly relative to the computer casing 4. While the touchpad assembly 31 is swung downwardly, the switch element 313 on the bottom surface of the circuit board 312 is pushed by the triggering part 45 on the computer casing 4. Consequently, the switch element 313 is triggered to generate a corresponding key signal. When the user's finger is not placed on the covering plate 311, the touchpad assembly 31 is swung upwardly and returned to its original position in response to the internal elastic force of the switch element 313.

From the above descriptions, the present invention provides a touch module with a touchpad assembly and a connection assembly. The connection assembly comprises plural protrusion posts. The computer casing comprises plural fixing structures corresponding to the protrusion posts. When the connection assembly and the computer casing are combined together, the plural protrusion posts are inserted into the fixing holes of the corresponding fixing structures. The plural protrusion posts and the corresponding fixing structures are collaboratively formed as a hinge structure, which is swung along a fixed direction. The sponge structure used in the conventional touch module is replaced by the plural protrusion posts and the corresponding fixing structures. Since the sponge structure is not used, the irregular deformation is not produced. Consequently, while the touchpad assembly is pressed down, the touch module is not irregularly rocked. The touchpad assembly of the touch module can be swung stably. In other words, the touch module of the present invention is capable of solving the drawbacks of the conventional technologies. Moreover, it is not necessary to use screws to fix the touchpad assembly on the computer casing. Since the top surface of the touchpad assembly is aligned with the top surface of the computer casing, the top surface of the overall notebook computer is flat. In other words, the appearance is aesthetically pleasing.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touch module installed on a computer casing, the computer casing comprising an accommodation structure, plural first openings located at plural corners of the accommodation structure respectively, and plural fixing structures, the touch module comprising:
    a touchpad assembly accommodated within the accommodation structure and partially exposed outside the computer casing, wherein while the touchpad assembly is pressed down, the touchpad assembly is swung relative to the computer casing and contacted with the computer casing, so that a corresponding key signal is generated; and
    a connection assembly disposed on a bottom surface of the touchpad assembly, wherein the connection assembly is connected with the touchpad assembly and the computer casing, so that the connection assembly is permitted to be swung relative to the computer casing, wherein the connection assembly comprises plural first coupling plates perpendicular to the bottom surface of the touchpad assembly;
    wherein when the touchpad assembly is accommodated within the accommodation structure, the first coupling plates perpendicular to the bottom surface of the touchpad assembly are penetrated through the plural first openings and fixed on the plural fixing structures, respectively.

2. The touch module according to claim 1, wherein the connection assembly comprises:
    a main body fixed on the bottom surface of the touchpad assembly, wherein the first coupling plates are located at two ends of the main body, and extended externally from the two ends of the main body, wherein the first coupling plates are bent structures relative to the main body, wherein when the touchpad assembly is accommodated within the accommodation structure, the first coupling plates are located beside the corresponding fixing structures, and wherein the first coupling plates are aligned with the corresponding fixing structures; and
    plural protrusion posts aligned with the corresponding first coupling plates and disposed on the corresponding first coupling plates, wherein when the touchpad assembly is accommodated within the accommodation structure, the plural protrusion posts are inserted into the corresponding fixing structures, so that the connection assembly and the computer casing are combined together.

3. The touch module according to claim 2, wherein the computer casing further comprises a second opening, and the connection assembly further comprises a second coupling plate disposed on the bottom surface of the touchpad assembly, and a portion of the second coupling plate is protruded outside the touchpad assembly, and wherein when the touchpad assembly is accommodated within the accommodation structure, the portion of the second coupling plate is inserted into the second opening.

4. The touch module according to claim 3, wherein the main body and the second coupling plate are secured to the bottom surface of the touchpad assembly through an adhesive.

5. The touch module according to claim 2, wherein the first coupling plates and the plural protrusion posts are integrally formed with the main body, and wherein the main body, the first coupling plates, and the plural protrusion posts are made of metallic material.

6. The touch module according to claim 2, wherein plural fixing holes of the plural fixing structure are aligned with the corresponding protrusion posts, wherein when the plural protrusion posts are inserted into the fixing holes of the corresponding fixing structures, the plural protrusion posts are received within the corresponding fixing structures, and wherein while the touchpad assembly is pressed down and the touchpad assembly is swung relative to the computer casing, the plural protrusion posts are rotated within the corresponding fixing holes.

7. The touch module according to claim 1, wherein the touchpad assembly comprises:
 a covering plate exposed outside the computer casing;
 a circuit board connected with the covering plate and the connection assembly; and
 a switch element disposed on a bottom surface of the circuit board and electrically connected to the circuit board, wherein when the switch element is contacted with the computer casing, the switch element is triggered to generate the key signal.

8. The touch module according to claim 7, wherein the circuit board is connected with the covering plate through an adhesive.

9. The touch module according to claim 7, wherein while the covering plate is pressed down, the circuit board is pushed by the covering plate and the connection assembly is pushed by the circuit board, so that the connection assembly is swung relative to the plural fixing structures by using the plural protrusion posts as pivotal shafts, and wherein while the covering plate is pressed down, the covering plate, the circuit board and the switch element are swung downwardly relative to the computer casing.

* * * * *